3,340,311
STABILIZED CATALYST FOR THE DEHYDRO-
GENATION OF 1-TETRALONE AND/OR 1-
TETRALOL
Henry C. Chitwood and Benjamin T. Freure, Charleston, and Robert W. Cunningham, St. Albans, W. Va., assignors to Union Carbide Corporation, a corporation of New York
No Drawing. Filed Dec. 20, 1965, Ser. No. 515,170
18 Claims. (Cl. 260—621)

This application is a continuation-in-part of application Ser. No. 200,913 entitled, "Stabilized Catalyst," by H. C. Chitwood, B. T. Freure, and R. W. Cunningham, filed June 8, 1962, now abandoned, the latter identified application being assigned to the same assignee as the instant application.

The present invention relates to an improved stabilized dehydrogenation catalyst and to the catalytic dehydrogenation of 1-tetralone in the presence of said catalyst thereby producing alpha-naphthol. More particularly, it is concerned with an improved nickel dehydrogenation catalyst containing copper essentially in the form of copper metal, and chromium essentially in the form of its oxide which has been stabilized for catalytic dehydrogenation of 1-tetralone and/or 1-tetralol by the presence therein of controlled amounts of an alkali metal, at least part of which is in the form of a sulfate, and sulfur in the form of a sulfate of an alkali metal.

The present invention is based on the discovery that nickel can be stabilized by the presence therein of critical amounts of alkali metal and sulfur, both described hereinafter in detail, to give a vastly improved catalyst with which to effect the catalytic dehydrogenation of 1-tetralone to alpha-naphthol. For instance, using the novel catalyst of this invention, maximum yields as high as 90 percent, and higher, and maximum efficiencies greater than 99 percent are obtained at a temperature of 375° C., in the dehydrogenation of an admixture of 1-tetralone and 1-tetralol to alpha-naphthol. Moreover, the noval catalyst will support feed rates (of 1-tetralone plus 1-tetralol) which are double the feed rates of the prior art catalysts, such as described in U.S. 2,588,359, for periods up to 100 hours, and more, while maintaining highly satisfactory yield, conversion, and efficiency values. This increased productivity is of paramount significance since it affords obvious economic and commercial advantages. In addition, the novel catalyst upon eventually becoming inactivated during the initial catalytic dehydrogenation of 1-tetralone can be readily reactivated to its active catalytic state. The reactivated catalyst, as will be apparent from the operative data, possesses a catalytic life which is equal to or greater than the catalyst employed in the initial dehydrogenation run. Furthermore, the reactivation cycle can be effected a number of times thus increasing the overall catalytic life to 480 hours, and longer. By way of a further advantage, the novel stabilized catalyst of this invention exhibits increased mechanical strength since no disintegration was observed during the dehydrogenation of a mixture of 1-tetralone and 1-tetralol to alpha-naphthol.

The formation of alpha-naphthol by dehydrogenation of 1-tetralone and 1-tetralol, a reaction in which the novel catalyst exhibits several unexpected and unobvious advantages, is illustrated by the following equations:

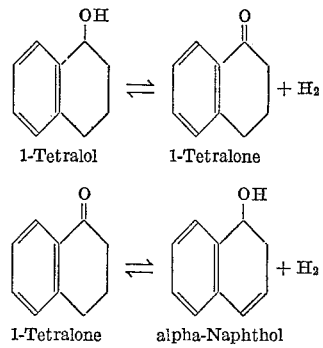

The reactions, which are reversible, take place on passing the oxygenated tetralin (1-tetralone and 1-tetralol) over the novel stabilized catalyst heated to the dehydrogenation temperature. As far as is known, the reactions do not depart from the laws or principles which have been generally accepted as governing opposing reactions, equilibrium and equilibrium concentrations. Accordingly, the ratios of the amounts of the 1-tetralone, 1-tetralol, and alpha-naphthol present at equilibrium depend upon the temperature and hydrogen pressure (concentration). As will be apparent, the equilibrium represented by the equation can be shifted to the left by increasing the hydrogen pressure. An increase in reaction temperature, on the other hand, shifts the equilibrium to the right, by reason of the free energy relations of the system.

By way of further illustration, the equilibrium for alpha-naphthol, 1-tetralone, and hydrogen is expressed by the following equation:

$$\frac{p(\text{alpha-naphthol}) \times p(\text{hydrogen})}{p(\text{1-tetralone})} = k$$

in which p(alpha-naphthol), p(hydrogen), and p(1-tetralone) are the partial pressures in atmosphere in the system of alpha-naphthol, hydrogen, and 1-tetralone, respectively, and $k$ varies with the temperature. Stated in other words, the molar ratio alpha-naphthol to 1-tetralone, at equilibrium, is inversely proportional to the hydrogen pressure:

$$\frac{p(\text{alpha-naphthol})}{p(\text{1-tetralone})} = \frac{k}{p(\text{hydrogen})}$$

in which $k$ has the value of 5.63 and 13.2 at temperatures of 350° and 375° C., respectively. Thus at a temperature of 350° C., for instance, the molar ratio of alpha-naphthol to 1-tetralone at one atmosphere of hydrogen pressure is 5.63 which corresponds to a mole percentage of alpha-naphthol in admixture with 1-tetralone of 85. At a temperature of 375° C., the molar ratio of alpha-naphthol to 1-tetralone at one atmosphere of hydrogen pressure is 13.2 which corresponds to a mole percentage of alpha-naphthol in admixture with 1-tetralone of 93. The mole percents for other temperatures and pressures are readily determined.

As stabilizing constituents of the improved nickel catalysts, the alkali metals which can be employed are lithium, sodium, potassium, and mixtures thereof, at least a portion of said alkali metal being in the form of a sulfate. Another stabilizing constituent, though probably to a lesser degree, of the improved nickel catalysts is sulfur in the form of a sulfate of the alkali metal. When the ratio of atoms of alkali metal to atoms of sulfur is less than 2, the sulfur is present in the form of alkali metal sulfate and/or alkali metal pyrosulfate. When the ratio of atoms of alkali metal to atoms of sulfur is at least 2, the sulfur is present in the form of alkali metal sulfate. With a ratio of atoms of alkali metal to atoms of sulfur greater than 2, the "excess" alkali metal, so to speak, can be essentially in the form of the nitrate, nitrite, oxide, hydroxide, carbonate, and mixtures thereof. This is readily explained from a consideration of this specification since the alkali metal nirate component which is employed in the catalyst preparation, upon thermal decomposition, forms the alkali metal nitrite and ultimately the alkali metal oxide. This metal oxide, in turn, can be converted in the presence of water such as from the atmosphere to the corresponding metal hydroxide. In the presence of carbon dioxide such as from the atmosphere either the metal oxide and/or metal hydroxide can be converted to the corresponding alkali metal carbonate. Thus, as indicated above, any or all of the "excess" alkali metal can be essentially in the form of nitrate, nitrite, oxide, hydroxide, and/or carbonate.

The concentration of alkali metal is a critical limitation. However, within this critical range, extremely eminent results are obtained when the novel catalyst is employed in the catalytic dehydrogenation of 1-tetralone to alpha-naphthol. This critical concentration of alkali metal is set forth in Table A below.

TABLE A

| Alkali metal: | Weight, per 100 parts of nickel |
| --- | --- |
| Lithium | 0.5 to 1.5 |
| Sodium | 1.0 to 3.0 |
| Potassium | 1.0 to 3.0 |

When mixtures of alkali metals are employed as the stabilizing constituents, then the critical amounts of the alkali metals are governed by the following equation:

2 lithium+sodium+potassium=1 to 3 parts wherein lithium equals 0 to 1.5 parts, wherein sodium equals 0 to 3 parts, and wherein potassium equals 0 to 3 parts, all per 100 parts of nickel by weight. Thus, it is apparent from the preceding equation that when an alkali metal mixture composed of sodium and potassium is employed as a stabilizing constituent, the concentration of said alkali metal mixture can be from 1 to 3 parts per 100 parts of nickel by weight. Concentrations below or above the critical range of the alkali metal constituent result in catalyst which exhibit a marked loss or elimination of the unexpected and unobvious results referred to previously.

The values noted in Table A supra are to be compared with the values noted in the table, column 3, of U.S. Patent 2,588,359, which are reproduced, in part, in Table B below:

TABLE B

| Alkali metal sulfate: | Weight, per 100 parts of nickel |
| --- | --- |
| Lithium sulfate | 0.3 to 0.8 |
| Sodium sulfate | 0.3 to 0.8 |
| Potassium sulfate | 0.3 to 1.0 |

However, since Table B is concerned with the concentration range of alkali metal sulfates, a direct comparison with Table A (which is concerned with alkali metals per se) is not readily seen. Thus Table C below translates the data of Table B in terms of alkali metals per se.

TABLE C

| Alkali metal: | Weight, per 100 parts of nickel |
| --- | --- |
| Lithium | 0.04 to 0.10 |
| Sodium | 0.10 to 0.26 |
| Potassium | 0.14 to 0.45 |

Consequently, the minimum limit of the alkali metal concentration of the novel catalyst of this invention is greater than 200 percent (and upwards to 500 percent) of the concentration of the maximum limit of the corresponding alkali metal of U.S. 2,588,359.

As indicated previously, sulfur, in the form of a sulfate of the alkali metal, is a stabilizing constituent of the improved nickel catalyst. The ratio of atoms of alkali metal to atoms of sulfur is from 1.2 to 8, and preferably from 2.5 to 4. It is more convenient, however, to express the preferred ratio as atoms of alkali metal to mols of sulfate since all the sulfur may be expressed as sulfate ($SO_4$).

Copper is present essentially in the form of metallic copper. In amount, it may be varied over a range from about 15 to 40 parts of copper per 100 parts of nickel without greatly influencing the behavior of the catalyst.

Chromium, which is also an essential constituent, present essentially in the form of its oxide, is much more critical as to amount. The useful range of chromium oxide content corresponds to about 0.5 to 4 parts of chromium per 100 parts of nickel by weight. At concentrations below 0.5 part, the activity of the catalyst is lowered, and at any concentration much higher or lower than 2 parts of chromium per 100 parts of nickel, the efficiency decreases. The best results are obtained with a chromium content of 2 parts per 100 parts of nickel, which is preferred.

Platinum metals, for instance, platinum and palladium, which have commonly been used as promoters for nickel catalysts, can be used in our stabilized nickel catalyst without observable detrimental effect. Their use, however, is unnecessary.

In preparing the catalyst, a mixture containing the metals in the desired ratios can be made by dissolving proportionate amounts of water-soluble compounds of the metals, for instance, the nitrates in a sufficient quantity of water to form a solution. Only pure materials should be used, the term "pure" being used in the sense that the compounds are free of injurious or unknown contaminants. Slab electrolytic nickel dissolved in nitric acid is a convenient source of pure nickel. The solution containing the metals is poured over the support material in a suitable vesesl. Practically any material can be used for a support which is inert, chemically and catalytically, and very porous and reasonably strong. The mixture may then be evaporated to dryness in a suitable vessel while being stirred with a spatula or shovel. When the excess water has been evaporated the catalyst will assume a pasty consistency. At this stage the catalyst may be placed in an oven and roasted, but a superior catalyst is obtained if the drying by evaporation is continued further until discrete particles are obtained and the decomposition of the nitrates has begun.

The roasting of the material can be carried out by placing it in a muffle furnace heated to a temperature at which the nitrates will decompose and holding at that temperature until the evolution of the oxides of nitrogen ceases. A rapid roasting of the material is preferred. For this purpose a furnace temperature of 375° C. is suitable, and at this temperature a period of about three hours is required to complete the roasting. The granules are again heated to a temperature of about 375° C. in air. The freshly roasted catalyst, before reduction, has a nonuniform surface appearance. Thereafter, it is heated in a stream of hydrogen at a temperature of about 375° C. for a period of about eight hours or more. Hydrogen is kept on the catalyst when it is not in use.

The catalyst can also be made, if desired, by repeated dippings of the support into the solution containing the catalyst ingredients, with drying and roasting of the catalyst between dippings. Although the dipping procedure facilitates the handling of materials on a large scale, the single evaporation and roasting method permits a much closer control of the ratio of active materials in the finished catalyst, and is preferred.

The operating temperature for the production of alpha-naphthol by dehydrogenation of the corresponding oxygenated tetralin is from about 350° to 400° C., and preferably from about 360° to 390° C. The optimum temperature is approximately 375° C.

The oxygenated tetralin is passed over the catalyst in vapor form. The best results have been obtained with a downstream pressure near atmospheric pressure, which is preferred. Pressures lower than atmospheric may be used, but since the conversion is nearly quantitative at atmospheric pressure, no great advantage in reduced pressures is apparent for most conversions.

A suitable feed rate is about 125, and lower, to about 350, and higher, milliliters of liquid oxygenated tetralin (1-tetralone and 1-tetralol) per liter of catalyst per hour, and preferably about 250 to 325 milliliters of liquid oxygenated tetralin per liter of catalyst per hour.

The process may be operated without feeding hydrogen into the converter but the catalyst life at high activity is greatly shortened. Although the hydrogen feed-rate is not critical, it nevertheless should not be excessive to the extent of adversely affecting the reaction because of the mass action effect. A molar ratio of hydrogen to oxygenated tetralin of from 1:1, and lower, to 10:1, and higher, is suitable; a molar ratio of from 2:1 to 7:1 is preferred. The optimum molar ratio is approximately 5–6:1.

The catalyst remains very active over long periods of careful operation and with feed materials free of sulfur and chlorine. Sulfur in the form of sulfides or mercaptans is especially to be avoided because as little as about 25 parts per million of sulfur in the feed may cause loss in activity. When the catalyst does lose activity it can be restored by oxidizing with air at about 375° C. and again reducing with hydrogen at a temperature of 375° C. Iron and stainless steel are very suitable as converter tube materials. Nickel and alloys of nickel and copper are nearly as suitable as iron and stainless steel but in tubes made of nearly pure copper or bronze the catalyst life is shortened.

In the following illustrative examples, the yield was determined by dividing the mols of alpha-naphthol produced by the mols of 1-tetralone and 1-tetralol charged. The efficiency was determined by dividing the mols of alpha-naphthol produced by the difference of the mols of 1-tetralone plus 1-tetralol charged and 1-tetralone plus 1-tetralol recovered.

*Example 1*

A. A catalyst was prepared in the following manner. Electrolytic nickel (1200 grams) and copper shot (395 grams) were dissolved in dilute nitric acid. To this solution, there were added 175 grams of a dilute acetic acid solution of chromium acetate (20 weight percent calculated as $Cr_2O_3$), 7 grams of sodium sulfate, and 12 grams of C.P. grade sulfuric acid. The resulting solution then was concentrated by evaporation until a specific gravity of 1.73 was attained at the boiling temperature. During the preparation of the catalyst, this constant gravity was maintained by the addition of sufficient distilled water to the solution. An initial batch of porous, ceramically bonded alumina spheres[1] (1030 grams) was immersed in the above solution for a period of 15 minutes, followed by roasting with hot air to about 375° C. for a period of about 15 minutes. This procedure was repeated two times, the final roast being maintained at 375° C. for a period of 3 hours. Thereafter, the impregnated alumina spheres were heated and reduced in a stream of hydrogen for about 16 hours at a temperature of about 375° C. When the catalyst was not in use it was stored in an atmosphere of hydrogen.

B. The above procedure was repeated with a second batch of the same alumina spheres (1212 grams) with the exception that the impregnating solution contained additional sodium nitrate to thus increase the sodium content of the catalyst.

C. A third batch of the same alumina spheres (1052 grams) was treated in the manner indicated above except that the impregnating solution contained an additional amount of sodium nitrate.

Additional pertinent data are set forth in Table I infra. The catalysts in B and C contained free alkali.

TABLE I

| Example | Na, Weight Percent of Ni | SO₄, Weight Percent of Ni | Na/SO₄, Atoms/Moles |
|---|---|---|---|
| A | 0.22 | 1.25 | 0.74 |
| B | 1.27 | 1.46 | 3.62 |
| C | 1.73 | 1.39 | 5.20 |

*Example 2*

A. A feed mixture containing 1-tetralone and 1-tetralol in admixture with hydrogen was passed at atmospheric pressure over 375 milliliters of the catalyst prepared as set forth in Example 1A supra. The catalyst was contained in a 1.5 x 60 inch stainless steel Dowtherm heated converter and maintained at a temperature of 375° C. The feed mixture comprised, by weight percent, 67.8 1-tetralone, 18.3 1-tetralol, 3.8 naphthalene, 5.5 tetralin, and 1.1 dihydronaphthalene. The feed rate was 150 milliliters of liquid feed mixture per liter of catalyst per hour, and the mol ratio of hydrogen to feed mixture was 5.6:1. After 30 hours of operation, infrared analysis of the crude condensate from the converter disclosed a single-pass maximum yield of alpha-naphthol of 74.4 percent and a maximum efficiency of 81.4 percent.

B. The exact procedure of Example 2A above was repeated except that the catalyst prepared in accordance with Example 1B was employed. The single-pass maximum yield of alpha-naphthol was 81.4 percent; the maximum efficiency was 90.6 percent.

C. The exact procedure of Example 2A above was repeated except that the catalyst prepared in accordance with Example 1C was employed. The single-pass maximum yield of alpha-naphthol was 82.5 percent; the maximum efficiency was 96.5 percent.

The data of Example 2 reveal that under direct representative conditions the use of the novel improved catalyst of the subject invention (Examples 2B and 2C) resulted in increased yield of about 9 to 11 percent and increased efficiencies of about 11 to 19 percent of alpha-naphthol as compared with the use of the catalyst (Example 2A) disclosed in U.S. 2,588,359.

*Example 3*

A stock solution containing nickel nitrate, copper nitrate, and chromium nitrate in very dilute nitric acid was prepared. This solution analyzed 12.6 weight percent nickel, 3.9 weight percent copper, and 0.24 weight percent chromium, based on the total weight of the solution. To a 1400 part portion of the above solution contained in a stainless steel vessel, there was added 22 parts of solid sodium nitrate, 1.1 parts of solid potassium nitrate, and 4.6 parts of concentrated sulfuric acid. Thereafter, 630 parts by weight of porous, ceramically bonded alumina spheres[2] was placed in a stainless steel basket which then was immersed in the above described solution for 20 minutes at 95° to 100° C. After this period of time the alumina spheres were allowed to drain, followed by roasting same in a muffle furnace at 375°–380° C. for 4 hours to decompose the nitrates to oxides. The above procedure, i.e., immersion and roasting, was repeated twice. Thereafter, the impregnated alumina spheres were heated in air for 5 hours and reduced in a stream of hydrogen for about 16 hours at a temperature of 375° C. When the catalyst was not in use it was stored in an atmosphere of hydrogen. Analysis of the catalyst disclosed a nickel con-

---

[1] Alundum spheres (SA–5201, Norton Company).

[2] Carborundum brand alumina AMC granules known as "Aloxite."

tent of 7.74 percent by weight. Additional pertinent data are set forth in Table II infra.

TABLE II

| Components: | Weight percent of nickel |
|---|---|
| Copper | 29.2 |
| Chromium | 2.7 |
| Sulfate | 2.85 |
| Sodium | 2.06 |
| Potassium | 0.13 |

The mol ratio of sodium plus potassium to sulfate was 3.11.

*Example 4*

A feed mixture containing 1-tetralone and 1-tetralol in admixture with hydrogen was passed at atmospheric pressure over 300 milliliters of the catalyst prepared as set forth in Example 3 supra. The catalyst was contained in a 1.5 inch diameter x 39 inch length, Dowtherm jacketed, stainless steel tube reactor and maintained at a temperature of 375° C. The feed mixture comprised, by weight percent, 68 1-tetralone, 29 1-tetralol, 2.5 naphthalene plus tetralin, and 0.5 water. The feed rate was 150 milliliters of feed mixture and 167 liters of hydrogen (measured at 25° C. and a pressure of about one atmosphere), per liter of catalyst per hour. After 24 hours of operation, gas chromatographic analysis of the crude condensate from the reactor disclosed a single-pass maximum yield of alpha-naphthol of 89 percent and a maximum efficiency greater than 99 percent. The efficiency value is highly significant since the production of hydrocarbon by-products was virtually non-existent.

At the end of the 24-hour period of operation, the feed rate was doubled, i.e., increased to 300 milliliters of feed mixture per liter of catalyst per hour. After 80 hours at this increased feed rate, the freezing point of the crude condensate had declined to 60° C. Gas chromatographic analysis of the crude condensate obtained during this period disclosed a single-pass maximum yield of alpha-naphthol of 82.5 percent and a maximum efficiency of 99 percent. The marked signficance of this experiment must not be overlooked since the use of the novel improved catalyst resulted in the production of alpha-naphthol at highly satisfactory yields and at excellent efficiencies. Moreover, these increased values were obtained over an extended period of operation at feed rates which are 100 percent greater than the prior art catalyst. The above data are, indeed, unexpected and unobvious.

At the termination of the 80 hour period of operation, the catalyst was reactivated by heating in air at a temperature of about 375° to 425° C. to thus remove any accumulated carbon thereon. When the quantity of carbon dioxide was below 0.5 percent by volume of the off-gas, the catalyst was purged with nitrogen and reduced in a stream of hydrogen for 16 hours at 375° C. The reactivated catalyst then was employed in the dehydrogenation reaction under the same conditions as indicated in the preceding paragraph. During a reaction period of 125 hours, gas chromatographic analysis of the crude condensate disclosed a single-pass maximum yield of alpha-naphthol of 88 percent and a maximum efficiency of 98 percent.

The catalyst was reactivated a second time in the manner explained above. This twice reactivated catalyst was again employed in the dehydrogenation reaction under the same conditions as above except that the feed rate was 150 milliliters of feed mixture per liter of catalyst per hour. The activity of the twice reactivated catalyst was maintained for at least 180 hours. The catalyst was considered to be inactive when the freezing point of the crude condensate was below 60° C.

*Example 5*

A mixture was prepared using the following materials:
(a) 290 grams of an aqueous stock solution of nickel nitrate, $Ni(NO_3)_2$ containing 16.3 percent nickel by weight;
(b) 63.1 grams of copper nitrate trihydrate,

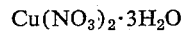

(c) 6.92 grams of chromium acetate,

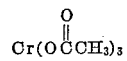

solution containing the equivalent of 20 percent chromium sesquioxide, $Cr_2O_3$. The materials described above were brought into solution by the addition of sufficient water to give a stock solution which contained 11.5 weight percent nickel, 4.02 weight percent copper, and 0.23 weight percent chromium. Several portions of the above stock solution were prepared, and in each portion there was dissolved an amount of sodium sulfate and potassium sulfate so that each portion contained an amount of sodium and potassium which would give a catalyst containing 1.6 weight percent sodium and 0.1 weight percent potassium, based on the weight of nickel. To decrease the ratio of alkali metal to sulfate below 2.0, an amount of concentrated sulfuric acid was added to the first portion; to increase the raito of alkali metal to sulfate above 2.0, an amount of alkali metal nitrate was added to the third, fourth, and fifth portions. Thereafter, each portion was evaporated to dryness with 450 milliliters of porous, ceramically bonded alumina spheres [3]. The resulting impregnated alumina spheres then were roasted in a muffle furnace at 400° C. for 4 hours, and then reduced in a stream of hydrogen for about 16 hours at a temperature of 375° C. When the resulting catalysts were not in use, they were stored in an atmosphere of hydrogen.

Additional pertinent data are set forth in Table III infra.

TABLE III

| | Catalyst A | Catalyst B | Catalyst C | Catalyst D | Catalyst E |
|---|---|---|---|---|---|
| Na, wt. percent of Ni | 1.6 | 1.6 | 1.6 | 1.6 | 1.6 |
| K, wt. percent of Ni | 0.1 | 0.1 | 0.1 | 0.1 | 0.1 |
| SO₄, wt. percent of Ni | 3.94 | 3.44 | 2.50 | 2.28 | 2.03 |
| Na plus K/SO₄ Ratio (Atoms/Moles) | 1.73 | 2.00 | 2.78 | 3.13 | 3.50 |

*Examples 6–10*

The five catalysts prepared in Example 5 supra were employed in separate dehydrogenation reactions in a manner similar to Example 4. The feed mixture comprised, by weight percent, 58.3 1-tetralone, 37.2 1-tetralol, and 4.5 tetralin. The reaction temperature was 375° C., the feed rate was 300 milliliters of liquid feed mixture per liter of catalyst per hour, and the mol ratio of hydrogen to feed mixture was 3.0. The reactivation of the catalysts was effected in the manner set forth in Example 4 supra. The catalyst life was considered to be terminated when the ratio of alpha-naphthol to 1-tetralone in the crude condensate decreased to a value of four.

Additional pertinent data are set forth in Table IV infra.

---
[3] Carborundum brand alumina AMC granules known as "Aloxite."

TABLE IV

| | Example Nos. | | | | |
|---|---|---|---|---|---|
| | 6 | 7 | 8 | 9 | 10 |
| Catalyst | A | B | C | D | E |
| Alkali Metal/Sulfate Ratio | 1.73 | 2.00 | 2.78 | 3.13 | 3.50 |
| Initial Run: | | | | | |
| Catalyst Life, hrs | 24 | 65 | 83 | 24 | 16 |
| Maximum Yield, Percent | 83 | 90.6 | 89.4 | 86.8 | 80.6 |
| Maximum Efficiency, Percent | 98 | >99 | 100 | 99.2 | 98.5 |
| After 1st Reactivation: | | | | | |
| Catalyst Life, hrs | 24 | 67 | 96 | 80 | 52 |
| Maximum Yield, Percent | 92.5 | 90.8 | 93.4 | 91.3 | 85.3 |
| Maximum Efficiency, Percent | 99 | >99 | >99 | >99 | >99 |
| After 2d Reactivation: | | | | | |
| Catalyst Life, hrs | | | 29 | 72 | 95 | 47 |
| Maximum Yield, Percent | | | 87.3 | 91.3 | 93.5 | 87.6 |
| Maximum Efficiency, Percent | | | >99 | >99 | >99 | 98.7 |
| After 3d Reactivation: | | | | | |
| Catalyst Life, hrs | | | | | 84 | 95 |
| Maximum Yield, Percent | | | | | 92.8 | 89.6 |
| Maximum Efficiency, Percent | | | | | >99 | >99 |

The data in Table IV disclose that when the ratio of alkali metal to sulfate decreases below 2 (catalyst A), there is a marked loss of catalytic life of the catalyst.

Example 11

Two catalysts were prepared in the manner set forth in Example 5 supra except that lithium nitrate or potassium nitrate together with sulfuric acid was added to equal portions of the stock solution. The pertinent data are set forth in Table V infra.

TABLE V

| | Catalyst F | Catalyst G |
|---|---|---|
| Li, wt. percent of Ni | 0.6 | 0.00 |
| K, wt. percent of Ni | 0.00 | 1.77 |
| $SO_4$, wt percent of Ni | 2.75 | 2.8 |
| Alkali Metal/$SO_4$ Ratio (Atoms/Moles) | 3.0 | 1.55 |
| Support | (1) | (2) |

[1] Carborundum brand alumina AMC granules (Aloxite).
[2] Norton Alundum spheres No. SA-5215 (Macroport).

Examples 12–13

The two catalysts prepared in Example 11 were employed in separate dehydrogenation reactions in a manner similar to Examples 6–10. The pertinent data are set forth in Table VI infra.

TABLE VI

| | Example Nos. | |
|---|---|---|
| | 12 | 13 |
| Catalyst | F | G |
| Catalyst Live,[1] hrs | 48 | 43 |
| Maximum Yield,[2] percent | 88 | 90 |
| Maximum Efficiency, percent | 92 | 98 |

[1] Hours of operation in which the ratio of alpha-naphthol to 1-tetralone in the crude condensate was above 4.
[2] Alpha-naththol.

Example 14

Four catalysts were prepared in the manner set forth in Example 5 except that sodium nitrate together with sulfuric acid was added to equal portions of the stock solution. The pertinent data are set forth in Table VII infra.

TABLE VII

| | Catalyst H | Catalyst I | Catalyst J | Catalyst K |
|---|---|---|---|---|
| Na, wt. percent of Ni | 2.06 | 1.25 | 1.50 | 1.5 |
| $SO_4$, wt. percent of Ni | 2.9 | 4.1 | 2.7 | 3.0 |
| Na/$SO_4$ Ratio (Atoms/Moles) | 3.0 | 1.28 | 2.3 | 2.1 |
| Support | (1) | (2) | (3) | (4) |

[1] Norton Alundum spheres No. SA-5215.
[2] Carborundum brand alumina AMC granules (Aloxite).
[3] Filtros brand alumina spheres FA-441M.
[4] Carborundum brand silicon carbide CMC granules.

Examples 15–18

The four catalysts prepared in Example 14 were employed in separate dehydrogenation reactions in a manner similar to Examples 6–10. The pertinent data are set forth in Table VIII infra.

TABLE VIII

| | Example No. | | | |
|---|---|---|---|---|
| | 15 | 16 | 17 | 18 |
| Catalyst | H[1] | I | J | K |
| Catalyst Life,[2] hours | 126 | 82 | 75 | 99 |
| Maximum Yield,[3] percent | 85 | 85 | 86 | 86 |
| Maximum Efficiency, percent | 99 | 99 | 98 | 98 |

[1] Excess Na essentially in the form of the carbonate.
[2] Hours of operation in which the freezing point of the crude condensate was above 60° C.
[3] Alpha-naphthol.

What is claimed is:

1. A stabilized dehydrogenation catalyst consisting essentially of nickel; copper, essentially in the form of metallic copper; chromium, essentially in the form of its oxide; alkali metal, at least part of which is in the form of a sulfate, and any remainder being essentially in the form of a member of the group consisting of nitrate, nitrite, oxide, hydroxide, carbonate, and mixtures thereof; said alkali metal being of the group consisting of lithium, sodium, potassium, and mixtures thereof; said copper and chromium being present in a ratio of about 15 to 40 parts of copper and about 0.5 to 4 parts of chromium per 100 parts of nickel, computed on a metal basis by weight; said alkali metal, as individual components, being present in a ratio of 0.5 to 1.5 parts of lithium, 1 to 3 parts of sodium, and 1 to 3 parts of potassium, all per 100 parts of nickel by weight; said alkali metal, as mixtures thereof, being governed by the equation 2 lithium+sodium+potassium=1 to 3 parts wherein lithium equals 0 to 1.5 parts, wherein sodium equals 0 to 3 parts, and wherein potassium equals 0 to 3 parts, all per 100 parts of nickel by weight; and the ratio of atoms of alkali metal to atoms of the sulfur in the sulfate is a value in the range of from 1.2 to 8.

2. The catalyst of claim 1 wherein the ratio of atoms of alkali metal to atoms of sulfur is a value in the range of from 2.5 to 4.

3. The catalyst of claim 1 wherein said member is oxide.

4. The catalyst of claim 1 wherein said member is nitrate.

5. The catalyst of claim 2 wherein said alkali metal is sodium.

6. The catalyst of claim 2 wherein said alkali metal is potassium.

7. The catalyst of claim 2 wherein said alkali metal is lithium.

8. The catalyst of claim 2 wherein said alkali metal is a mixture of alkali metals.

9. The catalyst of claim 2 wherein said alkali metal is a mixture of potassium and sodium.

10. A method for producing alpha-naphthol by catalytic dehydrogenation which comprises passing a compound of the group consisting of 1-tetralone, 1-tetralol, and mixtures thereof, in the vapor phase over the stabilized dehydrogenation catalyst defined in claim 1 at a temperature in the range of from about 350° to about 400° C.

11. The method of claim 10 wherein said dehydrogenation catalyst is defined in claim 2.

12. The method of claim 10 wherein said dehydrogenation catalyst is defined in claim 3.

13. The method of claim 10 wherein said dehydrogenation catalyst is defined in claim 4.

14. The method of claim 10 wherein hydrogen and a feed mixture of 1-tetralone and 1-tetralol, in the vapor phase, is passed over the stabilized dehydrogenation catalyst defined in claim 5, at a feed rate of from about 250 to about 325 milliliters of liquid feed mixture per liter of catalyst per hour, at a molar ratio of hydrogen to feed mixture of from about 2:1 to about 7:1, and at a temperature in the range of from about 360° to about 390° C.

15. The method of claim 10 wherein hydrogen and a feed mixture of 1-tetralone and 1-tetralol, in the vapor phase, is passed over the stabilized dehydrogenation catalyst defined in claim 6, at a feed rate of from about 250 to about 325 milliliters of liquid feed mixture per liter of catalyst per hour, at a molar ratio of hydrogen to feed mixture of from about 2:1 to about 7:1, and at a temperature in the range of from about 360° to about 390° C.

16. The method of claim 10 wherein hydrogen and a feed mixture of 1-tetralone and 1-tetralol, in the vapor phase, is passed over the stabilized dehydrogenation catalyst defined in claim 7, at a feed rate of from about 250 to about 325 milliliters of liquid feed mixture per liter of catalyst per hour, at a molar ratio of hydrogen to feed mixture of from about 2:1 to about 7:1, and at a temperature in the range of from about 360° to about 390° C.

17. The method of claim 10 wherein hydrogen and a feed mixture of 1-tetralone and 1-tetralol, in the vapor phase, is passed over the stabilized dehydrogenation catalyst defined in claim 8, at a feed rate of from about 250 to about 325 milliliters of liquid feed mixture per liter of catalyst per hour, at a molar ratio of hydrogen to feed mixture of from about 2:1 to about 7:1, and at a temperature in the range of from about 360° to about 390° C.

18. The method of claim 10 wherein hydrogen and a feed mixture of 1-tetralone and 1-tetralol, in the vapor phase, is passed over the stabilized dehydrogenation catalyst defined in claim 9, at a feed rate of from about 250 to about 325 milliliters of liquid feed mixture per liter of catalyst per hour, at a molar ratio of hydrogen to feed mixture of from about 2:1 to about 7:1, and at a temperature in the range of from about 360° to about 390° C.

No references cited.

LEON ZITVER, *Primary Examiner.*

D. M. HELFER, H. ROBERTS, *Assistant Examiners.*